E. W. NEWELL.
FRICTION DRAFT GEAR.
APPLICATION FILED AUG. 17, 1915.
1,232,595.
Patented July 10, 1917.
2 SHEETS—SHEET 1.
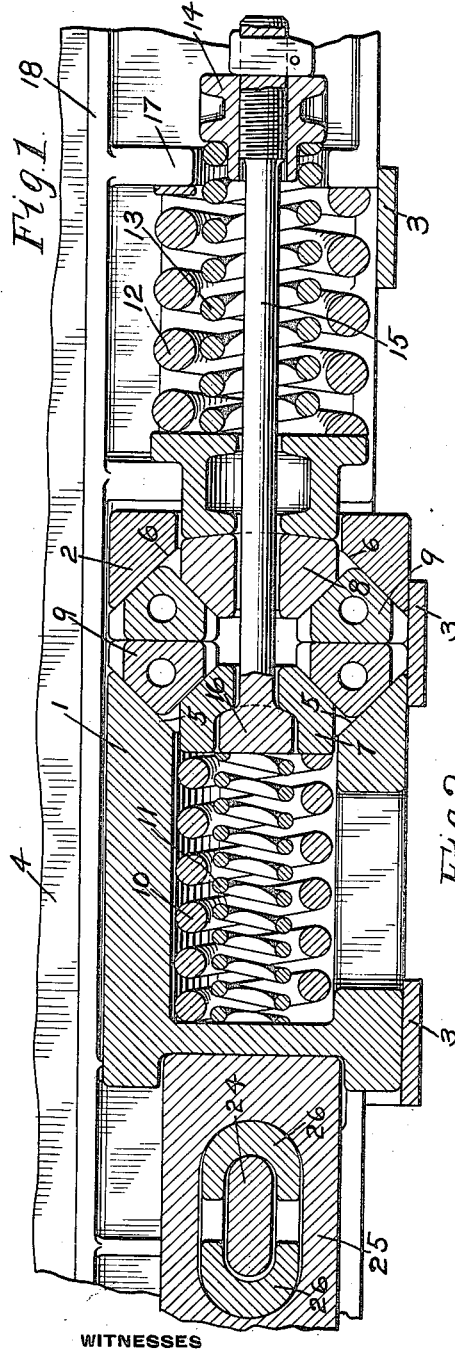
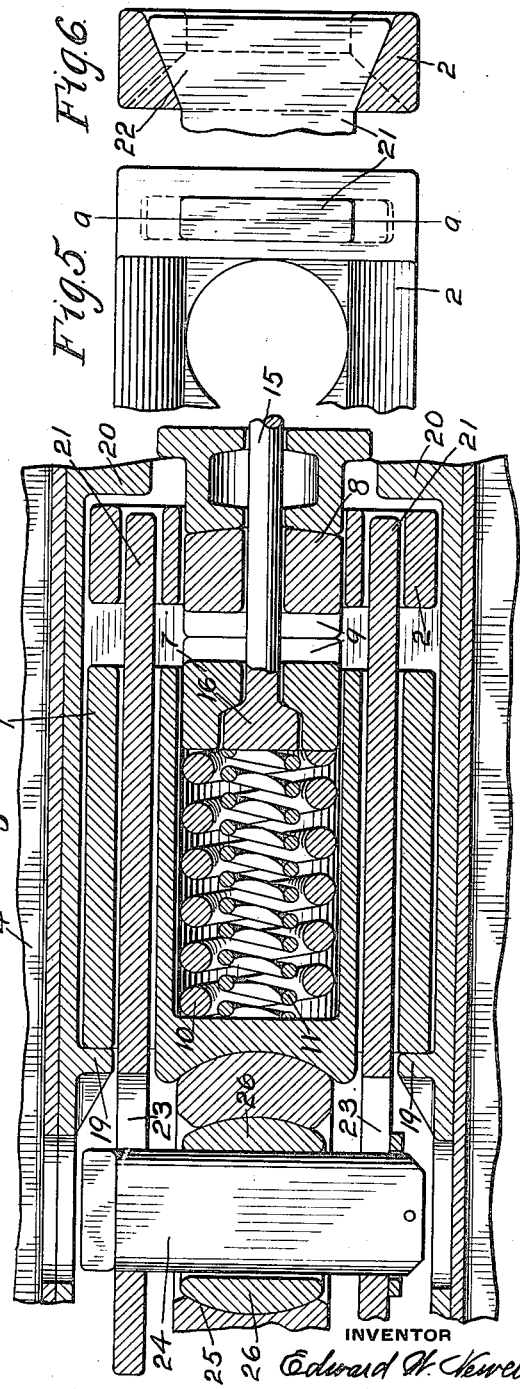
WITNESSES
INVENTOR
Edward W. Newell
by Wm. M. Cady
Att'y.

E. W. NEWELL.
FRICTION DRAFT GEAR.
APPLICATION FILED AUG. 17, 1915.
1,232,595.
Patented July 10, 1917.
2 SHEETS—SHEET 2.
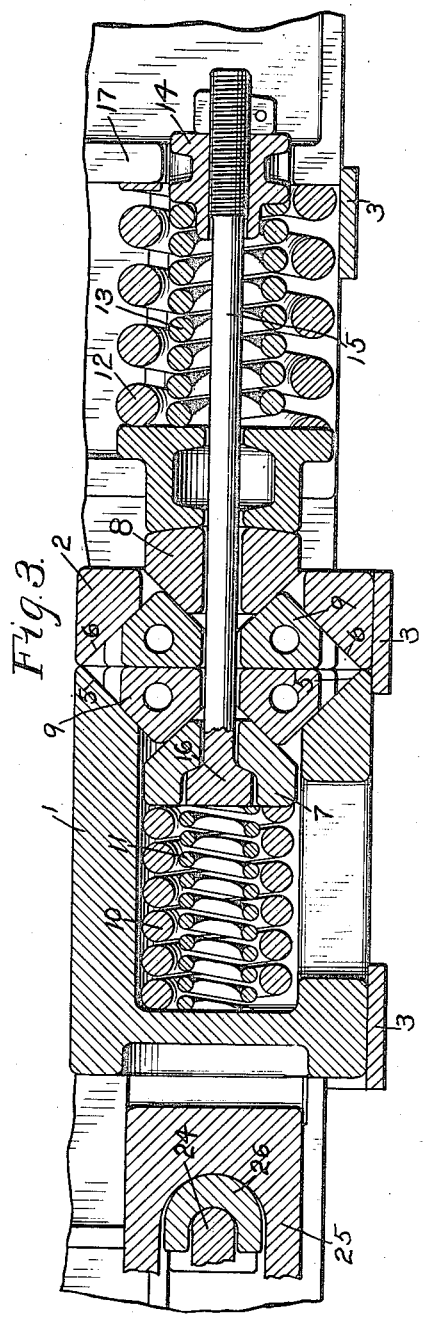
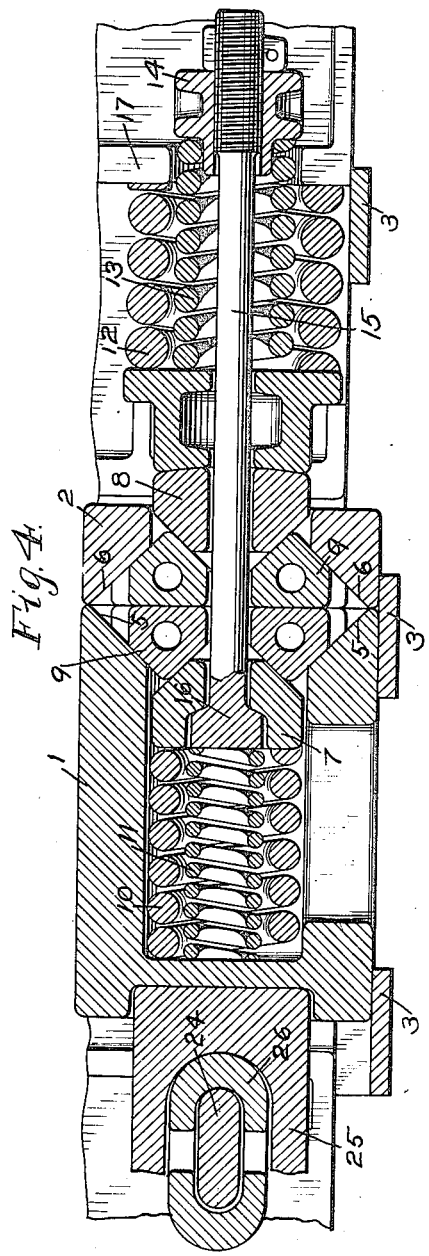
WITNESSES
H. W. Crowell
G. M. Clements
INVENTOR
Edward W. Newell
by Wm. M. Cady
Att'y

UNITED STATES PATENT OFFICE.

EDWARD W. NEWELL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FRICTION DRAFT-GEAR.

1,232,595.   Specification of Letters Patent.   Patented July 10, 1917.

Application filed August 17, 1915. Serial No. 45,878.

*To all whom it may concern:*

Be it known that I, EDWARD W. NEWELL, a citizen of the United States, residing at Pittsburgh, in the county of Allegheny and State of Pennsylvania, have invented new and useful Improvements in Friction Draft-Gears, of which the following is a specification.

This invention relates to draft gears, and more particularly to a friction draft gear for taking up and absorbing shocks due to buffing and draft stresses.

One object of my invention is to provide an improved friction draft gear in which the resistance set up under pull is less than that under buff.

Another object of my invention is to provide a draft gear device having means for equalizing the transmission of stresses from the draw-bar to the draft gear.

In the accompanying drawings; Figure 1 is a vertical longitudinal section of a friction draft gear embodying my improvements, showing the parts in release position; Fig. 2 a horizontal section thereof, in part; Fig. 3 a vertical longitudinal section of the draft gear, showing the parts compressed under a pulling stress; Fig. 4 a view similar to Fig. 3, showing the parts compressed under a buffing stress; Fig. 5 a partial face view of the rear friction element, showing one of the links inserted therein; and Fig. 6 a section on the line *a—a* of Fig. 5.

As shown in the drawings, a friction draft gear embodying my invention may comprise front and rear friction elements 1 and 2 adapted to be supported by carriers 3 secured to the car center sills 4.

The front friction element 1 is preferably in the form of a casing and has oppositely inclined friction faces 5, while the rear friction element 2 is provided with similar oppositely inclined friction faces 6 opposing the friction faces 5.

Centrally of the gear there is provided oppositely facing plunger wedges 7 and 8 each having oppositely inclined friction faces and wedge blocks 9, which may be made in halves, are interposed between the friction elements 1 and 2 and the plunger wedges 7 and 8, the wedge blocks having oppositely inclined friction faces for engaging corresponding friction faces of the friction elements and the plunger wedges.

Within the casing friction member 1 are mounted coil springs 10 and 11 adapted to bear against the front plunger wedge 7 and springs 12 and 13 at the opposite side of the friction members exert their force against the rear plunger wedge 8, which is preferably made in two sections having ball shaped engaging faces, so as to permit adjustment of the parts where there is any inequality in the fitting of the friction members.

The rear end of the inner spring 13 engages an adjustable nut 14 having screw-threaded engagement with a rod 15. This rod extends forward through apertures in the plunger wedges 7 and 8 and has a head 16 at the front end which engages a recess in the plunger wedge 7. By screwing up the nut 14, the spring 13 can be placed under initial compression to the extent desired.

The spring 12 bears at the rear end against an abutment or stop 17 carried by the stop casting 18 secured to each center sill.

The front friction element 1 engages stops 19 of the castings 18 and the rear friction element 2 engages stops 20 carried by said castings.

According to the present construction, the draft gear may be operated under draft stresses by side links 21 having enlarged heads 22 adapted to engage within corresponding recesses in the rear friction element 2. The front ends of the links are provided with elongated slots 23 for a key 24 which is adapted to connect the links with draw-bar 25.

In order to permit lateral movement of the draw-bar without disturbing the normal relation of the key 24 to the links 21, bushings 26 are interposed between the opposite sides of the key 24 and the draw-bar. These bushings are semi-cylindrical and have outer convex faces adapted to engage corresponding concave faces of the draw-bar, so that the draw-bar can rock laterally without moving the key 24, the draw-bar having its inner end curved to fit a corresponding curved face of the friction element 1.

Normally the parts are in the released position shown in Fig. 1 of the drawings and in operation, if the draw-bar be subjected to a buffing stress, the front friction element 1 is forced inwardly by the draw-bar, and since the rear friction element 2 is prevented from rearward movement by the stops 20, the wedge blocks 9 will be forced laterally inward and rearwardly against the resistance of the springs 12 and 13 which act on the plunger wedge 8 to opposite the movement of said blocks on the contracting friction faces of the friction elements 1 and 2 and the plunger wedges 7 and 8.

The springs 10 and 11 are also compressed by the inward movement of the friction element 1 and their force is exerted on the front plunger wedge 7, so that there is the combined resistances of all the springs acting to increase the frictional resistance of the wedge blocks 9 to movement, the parts under a buffing stress assuming the positions shown in Fig. 4 of the drawings.

In releasing after a buffing stress has been applied, the springs 10 and 11 will act against the front friction element 1 and as the draw-bar 25 moves forward, the friction element is pushed forwardly by the springs 10 and 11 and as this tends to open the space for the wedge blocks 9, the frictional resistance is reduced and the release thereby facilitated.

When a pulling stress is applied to the draw-bar, the front friction element 1 is prevented from moving forward by the stops 19, while the rear friction element 2 is pulled forward by the links 21 which are connected to the draw-bar 25. The wedge blocks 9 are thus caused to move laterally inward and forwardly, and the front plunger wedge 7 is forced forwardly by the movement of the wedge blocks 9, compressing the springs 10 and 11 and also the spring 13, through the pull on the rod 15. The rear plunger wedge 8 remains stationary, since the wedge blocks move forwardly and inwardly at a rate that maintains the plane of contact at a constant position.

The spring 13 of course exerts its compressive force against the plunger wedge 8, but this is not sufficient to overcome the reactive force of the springs 10 and 11, acting through the friction members.

It will now be seen that since the outer spring 12 bears against a stationary abutment and engages the central plunger 8 at the opposite end, the spring will not act under pulling stresses and consequently the resistance of the gear will be less than when under a buffing stress where all four springs are compressed, the positions of the parts under a pulling stress being shown in Fig. 3 of the drawings.

Having now described my invention, what I claim as new and desire to secure by Letters Patent, is:

1. In a friction draft gear, the combination with front and rear friction elements each having oppositely inclined friction faces, opposing centrally arranged plunger wedges having oppositely inclined friction faces, and wedge blocks having friction faces adapted to engage the friction faces of the friction elements and the plunger wedges, of springs acting on one of said plunger wedges, one spring reacting on a stationary stop and another on the other plunger wedge.

2. In a friction draft gear, the combination with front and rear friction elements each having oppositely inclined friction faces, opposing centrally arranged plunger wedges having oppositely inclined friction faces, and wedge blocks having friction faces adapted to engage the friction faces of the friction elements and the plunger wedges, of a stop, a spring interposed between said stop and one plunger wedge, a second spring acting on said plunger wedge, and a connection from the other plunger wedge forming an abutment for said second spring.

3. In a friction draft gear, the combination with front and rear friction elements each having oppositely inclined friction faces, opposing centrally arranged plunger wedges having oppositely inclined friction faces, and wedge blocks having friction faces adapted to engage the friction faces of the friction elements and the plunger wedges, of a stationary abutment, a spring interposed between said abutment and one of the plunger wedges, an abutment movable with the other plunger wedge, and a second spring interposed between the movable abutment and the first plunger wedge.

4. In a friction draft gear, the combination with front and rear friction elements each having oppositely inclined friction faces, opposing centrally arranged plunger wedges having oppositely inclined friction faces, and wedge blocks having friction faces adapted to engage the friction faces of the friction elements and the plunger wedges, of a spring acting on the front plunger wedge, a stationary abutment, a spring interposed between said abutment and the rear plunger wedge, a member movable with the front plunger wedge, and a spring interposed between the rear plunger wedge and said member.

In testimony whereof I have hereunto set my hand.

EDWARD W. NEWELL.

Witnesses:
A. M. CLEMENTS,
B. A. OLIVER.